ns us011735179B2

(12) United States Patent
Yan et al.

(10) Patent No.: US 11,735,179 B2
(45) Date of Patent: Aug. 22, 2023

(54) SPEECH CHIP AND ELECTRONIC DEVICE (71) Applicant: BAIDU ONLINE NETWORK TECHNOLOGY (BEIJING) CO., LTD., Beijing (CN)

(72) Inventors: Xiaoping Yan, Beijing (CN); Chao Tian, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 366 days.

(21) Appl. No.: 17/031,476

(22) Filed: Sep. 24, 2020

(65) Prior Publication Data

US 2021/0256973 A1 Aug. 19, 2021

(30) Foreign Application Priority Data

Feb. 13, 2020 (CN) .......................... 202010090986.1

(51) Int. Cl.
*G10L 15/22* (2006.01)
*G10L 15/26* (2006.01)
*G10L 13/00* (2006.01)

(52) U.S. Cl.
CPC .............. *G10L 15/22* (2013.01); *G10L 13/00* (2013.01); *G10L 15/26* (2013.01)

(58) Field of Classification Search
CPC .......... G10L 13/00; G10L 15/22; G10L 15/26
See application file for complete search history.

(56) References Cited

U.S. PATENT DOCUMENTS

| 7,561,932 | B1 * | 7/2009 | Holmes | G06F 3/165 |
| | | | | 381/77 |
| 8,005,672 | B2 * | 8/2011 | Vierthaler | G10L 21/0364 |
| | | | | 704/E21.002 |
| 10,152,968 | B1 * | 12/2018 | Agrusa | G06F 3/167 |

(Continued)

FOREIGN PATENT DOCUMENTS

| CN | 101115245 A | 1/2008 |
| CN | 201839449 U * | 5/2011 |

(Continued)

OTHER PUBLICATIONS

R. D. Lero, C. Exton and A. Le Gear, "Communications using a speech-to-text-to-speech pipeline," 2019 International Conference on Wireless and Mobile Computing, Networking and Communications (WiMob), 2019, pp. 1-6, doi: 10.1109/WiMOB.2019.8923157. (Year: 2019).*

(Continued)

*Primary Examiner* — Daniel C Washburn
*Assistant Examiner* — Oluwadamilola M Ogunbiyi
(74) *Attorney, Agent, or Firm* — Lippes Mathias LLP (57) ABSTRACT

The present disclosure discloses a speech chip and an electronic device. The speech chip includes a first processing module, a second processing module and a third processing module. The first processing module is configured to run an operating system, and to perform data scheduling on modules other than the first processing module in the chip. The second processing module is configured to perform a mutual conversion between speech and text based on a speech model. The third processing module is configured to perform digital signal processing on inputted speech.

20 Claims, 4 Drawing Sheets

(56) References Cited

U.S. PATENT DOCUMENTS

| | | | |
|---|---|---|---|
| 10,819,849 B1* | 10/2020 | Bondareva | G10L 15/26 |
| 10,833,839 B1* | 11/2020 | Tang | H04L 25/028 |
| 10,904,675 B2* | 1/2021 | Van Der Borght | H04R 25/65 |
| 11,671,173 B2* | 6/2023 | Amari | H04B 10/40 398/20 |
| 2017/0078490 A1* | 3/2017 | Kaminsky | H04M 3/4878 |
| 2018/0218750 A1 | 8/2018 | Nichkawde et al. | |
| 2019/0267001 A1* | 8/2019 | Byun | G10L 15/18 |
| 2020/0080501 A1* | 3/2020 | Andre | F02D 41/042 |
| 2020/0108260 A1* | 4/2020 | Haddad | A61B 5/7264 |
| 2020/0113038 A1* | 4/2020 | Mishin | H05H 9/04 |
| 2020/0295528 A1* | 9/2020 | Du | H01S 5/02325 |
| 2020/0312306 A1* | 10/2020 | Moritz | G10L 15/16 |
| 2020/0329144 A1* | 10/2020 | Morgan | G06F 40/30 |
| 2021/0151052 A1* | 5/2021 | Kang | G10L 15/18 |

FOREIGN PATENT DOCUMENTS

| | | | | |
|---|---|---|---|---|
| CN | 104053089 A | * | 9/2014 | |
| CN | 106341549 A | | 1/2017 | |
| CN | 108710596 A | * | 10/2018 | |
| CN | 108877799 A | | 11/2018 | |
| CN | 104184911 B | * | 4/2019 | G06F 16/9577 |
| CN | 110012527 A | | 7/2019 | |
| CN | 110399212 A | * | 11/2019 | |
| JP | H10319991 A | | 12/1998 | |
| JP | 3188999 B2 | | 7/2001 | |
| JP | 2008129412 A | | 6/2008 | |
| JP | 2020008635 A | | 1/2020 | |
| JP | 2020013034 A | | 1/2020 | |
| WO | WO-2008010071 A2 | * | 1/2008 | G06F 16/9577 |
| WO | WO-2020227878 A1 | * | 11/2020 | |

OTHER PUBLICATIONS

Office Action for Japanese Application No. 2020-216077, dated Feb. 2, 2022, 5 pages.

Partial European Search Report for Application No. 20216654.2, dated Jun. 8, 2021, 13 pages.

Michael Price et al., "A Scalable Speech Recognizer with Deep-Neural-Network Acoustic Models and Voice-Activated Power Gating", Feb. 7, 2017, IEEE International Solid-State Circuits Conference, Session 14, Deep-Learning Processors, 4 pages.

Shixuan Zheng et al., "An Ultra-Low Power Binarized Convolutional Neural Network-Based Speech Recognition Processor With On-Chip Self-Learning", IEEE Transactions on Circuits and Systems, Regular Papers, vol. 66, No. 12, Dec. 1, 2019, 14 pages.

Office Action for Chinese Application No. 202010090986.1, dated Mar. 17, 2021, 8 pages.

Extended European Search Report for Application No. 20216654.2, dated Oct. 21, 2021, 13 pages.

D.S.S. DeZoysa et al., "Project Bhashitha—Mobile Based Optical Character Recognition and Text-to-Speech System", The 13th International Conference on Computer Science & Education, Aug. 8, 2018, 6 pages.

A. Al-Marakeby et al., "Design of an Embedded Arabic Optical Character Recognition", J. Sign Process Syst (2013), Mar. 1, 2013, 10 pages.

* cited by examiner

SPEECH CHIP AND ELECTRONIC DEVICE

CROSS REFERENCE TO RELATED APPLICATION

This application is based on and claims priority to Chinese patent application No. 202010090986.1, filed on Feb. 13, 2020, the entire content of which is hereby introduced into this application as a reference.

FIELD

Embodiments of the present disclosure relate to a field of data processing technologies, and more particularly, relates to speech technologies. In detail, embodiments of the present disclosure provide a speech chip and an electronic device.

BACKGROUND

Currently, a speech chip is used in a smart speech product. A principle of the speech chip is as follows. A speech signal is collected through an external device, and an audio engine preprocesses the speech signal collected. A CPU sends the speech signal preprocessed to a remote server, such that the remote server recognizes and responds to the speech signal preprocessed. The CPU receives response speech and controls the external device to broadcast the response speech to a user.

SUMMARY

Embodiments of the present disclosure provide a speech chip and an electronic device, such that a smart speech product supports applications in offline scenes.

Embodiments of the present disclosure provide a speech chip. The speech chip includes a first processing module, a second processing module, and a third processing module.

The first processing module is configured to run an operating system, and to perform data scheduling on modules other than the first processing module in the chip.

The second processing module is configured to perform a mutual conversion between speech and text based on a speech model.

The third processing module is configured to perform digital signal processing on inputted speech.

Embodiments of the present disclosure further provide an electronic device. The device includes an audio interface and a speech chip. The audio interface is configured to receive inputted speech. The speech chip includes a first processing module, a second processing module, and a third processing module. The first processing module is configured to run an operating system, and to perform data scheduling on modules other than the first processing module in the chip. The second processing module is configured to perform a mutual conversion between speech and text based on a speech model. The third processing module is configured to perform digital signal processing on inputted speech.

BRIEF DESCRIPTION OF THE DRAWINGS

The accompanying drawings are used for a better understanding of the solution, and do not constitute a limitation to the present disclosure.

DETAILED DESCRIPTION

Exemplary embodiments of the present disclosure are described below with reference to the accompanying drawings, which include various details of embodiments of the present disclosure to facilitate understanding, and should be considered as merely exemplary. Therefore, those skilled in the art should recognize that various changes and modifications may be made to embodiments described herein without departing from the scope and spirit of the present disclosure. Also, for clarity and conciseness, descriptions of well-known functions and structures are omitted in the following description.

Embodiment 1

Figure 1:
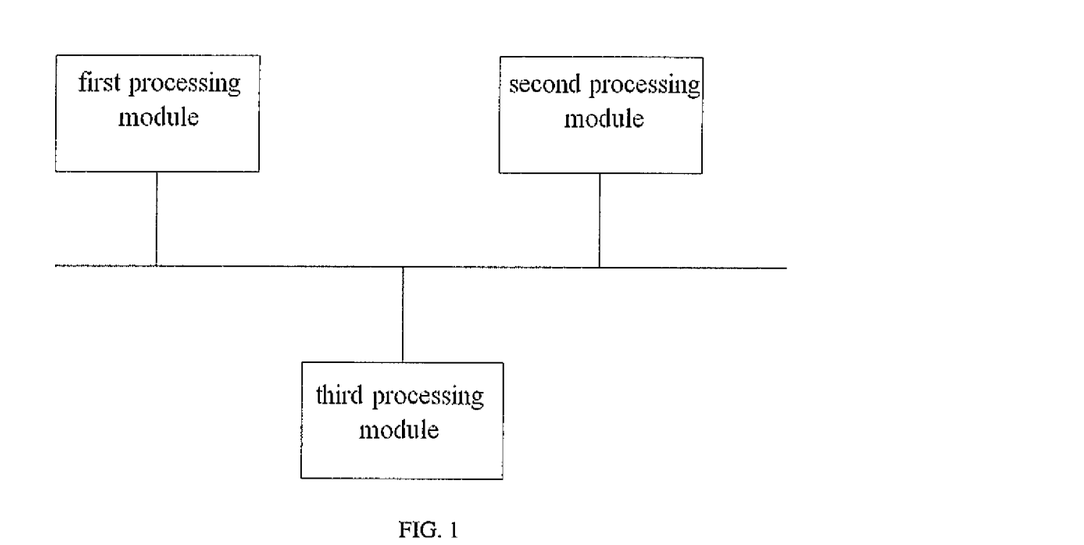
FIG. 1 is a schematic diagram of a speech chip according to Embodiment 1 of the present disclosure.

FIG. 1 is a schematic diagram of a speech chip according to Embodiment 1 of the present disclosure. The embodiment is applicable to a situation of carrying out speech processing in offline scenes. As illustrated in FIG. 1, the speech chip according to the embodiment of the present disclosure includes a first processing module, a second processing module, and a third processing module.

The first processing module is configured to run an operating system, and to perform data scheduling on modules other than the first processing module in the chip.

The second processing module is configured to perform a mutual conversion between speech and text based on a speech model.

The third processing module is configured to perform digital signal processing on inputted speech.

A speech model is any model that may perform the mutual conversion between speech and text. In detail, the speech model is a neural network model.

Based on the above three modules, applications supporting offline scenes may be implemented. Typically, an interaction process for implementing offline scene applications may be described as follows.

The third processing module is configured to perform the digital signal processing on the inputted speech.

The third processing module is configured to send a speech signal or speech feature data obtained after the digital signal processing to the second processing module. The second processing module is configured to recognize the inputted speech based on the speech model.

The first processing module is configured to obtain a response result from an external storage device through a peripheral interface based on a recognition result, and to feed the response result back to a user.

Optionally, the embodiment does not limit devices included in the first processing module, the second processing module, and the third processing module.

Typically, the first processing module includes at least one multi-core central processing unit.

The third processing module includes at least one digital signal processor.

In detail, the chip also includes a peripheral module and an audio engine module.

The peripheral module is configured to provide a clock of the chip, reset and an peripheral interface.

The audio engine module is connected to the peripheral module and is configured for communication protocol processing of an audio interface, signal filtering, data compression, and data decompression.

In the technical solution according to the embodiment of the present disclosure, the second processing module is added to the speech chip to perform the mutual conversion between speech and text on the inputted speech or an inputted text based on the speech model. And then, the first processing module responds to a user based on a conversion result, such that a smart speech product using the speech chip supports applications in offline scenes.

In addition, based on text-to-speech conversion implemented by the second processing module, the embodiment of the present disclosure enables the speech chip to execute applications related to text-to-speech conversion.

Embodiment 2

Figure 2:
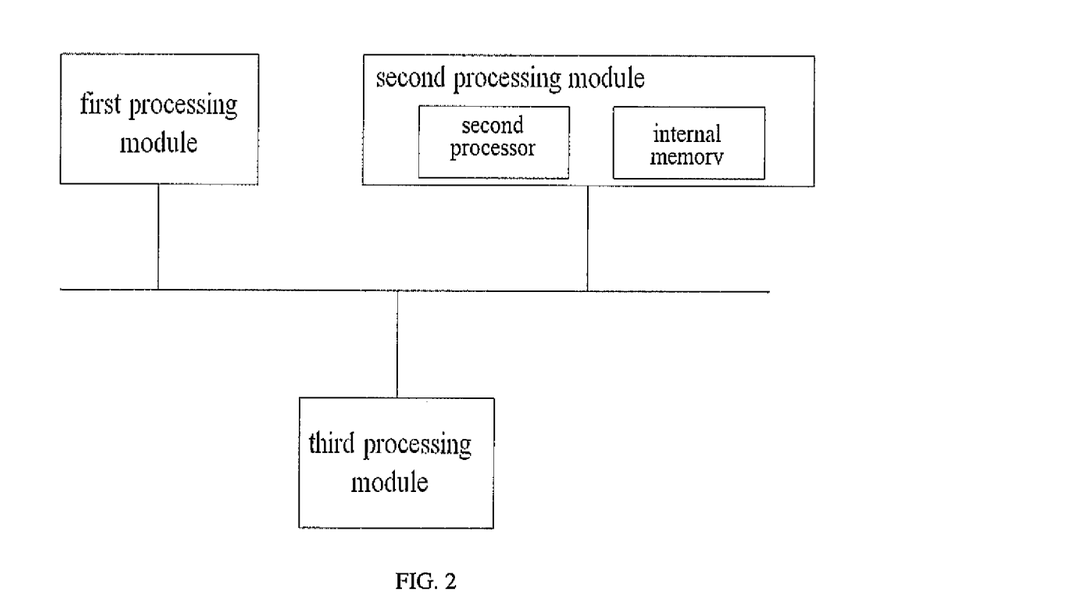
FIG. 2 is a schematic diagram of a speech chip according to Embodiment 2 of the present disclosure.

FIG. 2 is a schematic diagram of a speech chip according to Embodiment 2 of the present disclosure. Embodiment 2 is an optional implementation proposed based no Embodiment 1. With reference to FIG. 2, the second processing module of the speech chip according to the embodiment of the present disclosure includes a second processor and an internal memory.

The second processor is configured to perform the mutual conversion between speech and text based on the speech model.

The internal memory is connected to the second processor and is configured to store data generated during an execution of the speech model.

Optionally, the second processor may be any processor capable of implementing the mutual conversion between speech and text based on the speech model.

Typically, the second processor is an embedded neural network processor.

In order to make the second processor suitable for the speech chip, before performing the mutual conversion between speech and text based on the speech model, it is necessary to optimize an algorithm involved in the speech model.

The specific optimization process may include adjusting a data type related to the algorithm from a floating point type to an integer type so as to reduce the amount of calculation.

Before performing the mutual conversion between text and speech based on the speech model in the second processing module, it is included that the second processing module sets configuration information of the speech model based on model data to initialize the speech model. The model data is obtained by the first processing module from an external storage device through a peripheral interface.

In detail, the configuration information includes a model type and hyper-parameters of the model.

Based on the technical feature, the embodiment of the disclosure obtains the model data from the external storage device via the peripheral interface through the first processing module. The second processing module is configured to set the configuration information of the speech model based on the model data to achieve initialization of the speech model. In addition, the speech model may be updated by modifying the model data. The selection of different types of models may be realized by determining the model type.

In order to realize storage of the model data to further realize a loading of the model data, the chip further includes a storage module. The storage module connects to the second processing module and is configured to store the model data.

With the technical solution according to the embodiment of the present disclosure, the internal memory is added to the chip to store data generated during the execution of the speech model, thereby assisting the execution of the speech model and improving the execution efficiency of the speech model.

Embodiment 3

Figure 3:
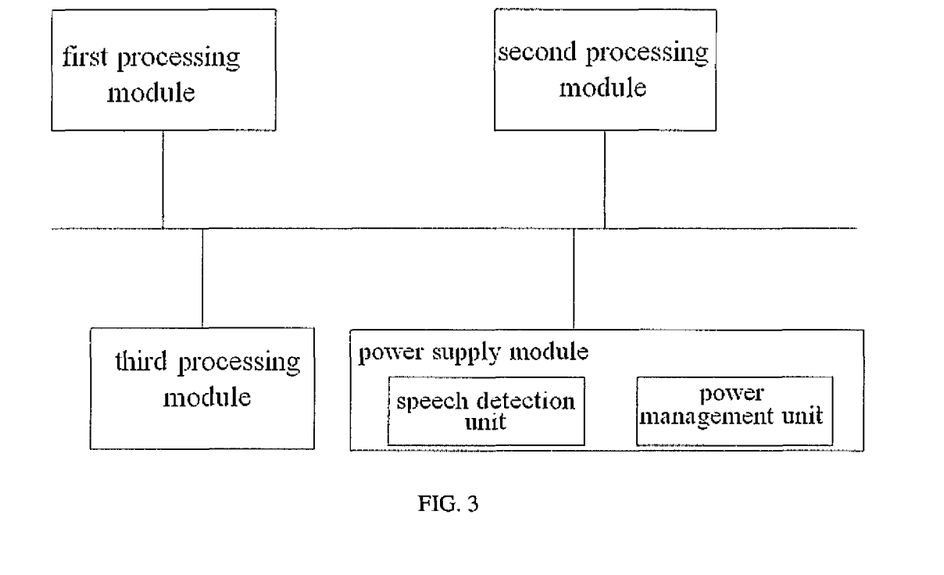
FIG. 3 is a schematic diagram of a speech chip according to Embodiment 3 of the present disclosure.

FIG. 3 is a schematic diagram of a speech chip according to Embodiment 3 of the present disclosure. Embodiment 3 is an optional implementation proposed on the basis of the foregoing embodiments. Referring to FIG. 3, a power supply module of the speech chip according to the embodiment of the present disclosure includes a speech detection unit and a power management unit.

The speech detection unit is configured to detect speech from a user in real time.

The power management unit is configured to, in response to detecting the speech from the user, supply power to the third processing module, such that the third processing module performs wake-up word detection on the speech from the user; and in response to the speech from the user comprising a wake-up word, supply power to modules other than the power supply module and the third processing module.

With the technical solution of the embodiment of the present disclosure, power is only supplied to the speech detection unit in the power supply module when the speech chip is not awakened, and modules other than the power supply module are powered off. Power is supplied to the third processing module after speech from the user is detected to perform the wake-up word detection, thereby further reducing power consumption of the chip when the chip is in standby.

Embodiment 4

Figure 4:
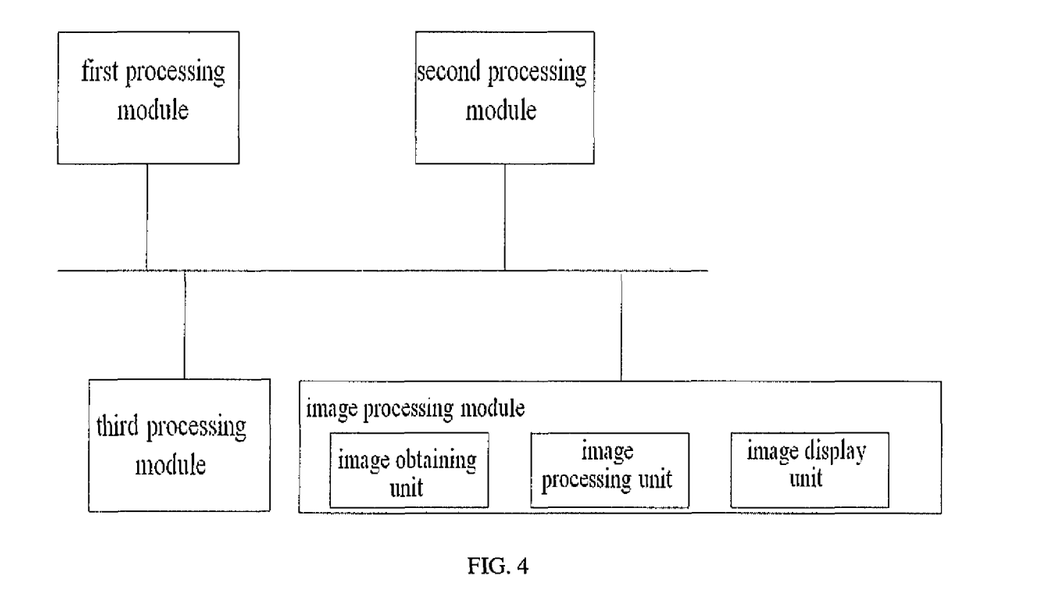
FIG. 4 is a schematic diagram of a speech chip according to Embodiment 4 of the present disclosure.

FIG. 4 is a schematic diagram of a speech chip according to Embodiment 4 of the present disclosure. Embodiment 4 is an optional implementation proposed on the basis of the foregoing embodiments. Referring to FIG. 4, the speech chip according to the embodiment of the present disclosure further includes an image processing module. The image processing module is configured to process an image collected to broadcast and/or display text information in the image to the user.

In detail, the image processing module includes an image obtaining unit, an image processing unit and an image display unit.

The image obtaining unit is configured to obtain the image.

The image processing unit is configured to perform text recognition on the image. The first processing module controls the second processing module to perform speech conversion on a text recognized and broadcasts speech converted to a user through an external device.

The image display unit is configured to display the image and/or the text recognized.

Based on the technical feature, the embodiment of the present disclosure may realize the recognition of text in the image through the image processing unit. The second processing module is controlled by the first processing module to perform speech conversion on the text recognized, thereby realizing related applications of converting text to speech.

With the technical solution according to the embodiment of the present disclosure, the image processing module is added to the speech chip to extend image-related functions.

Embodiment 5

Figure 5:
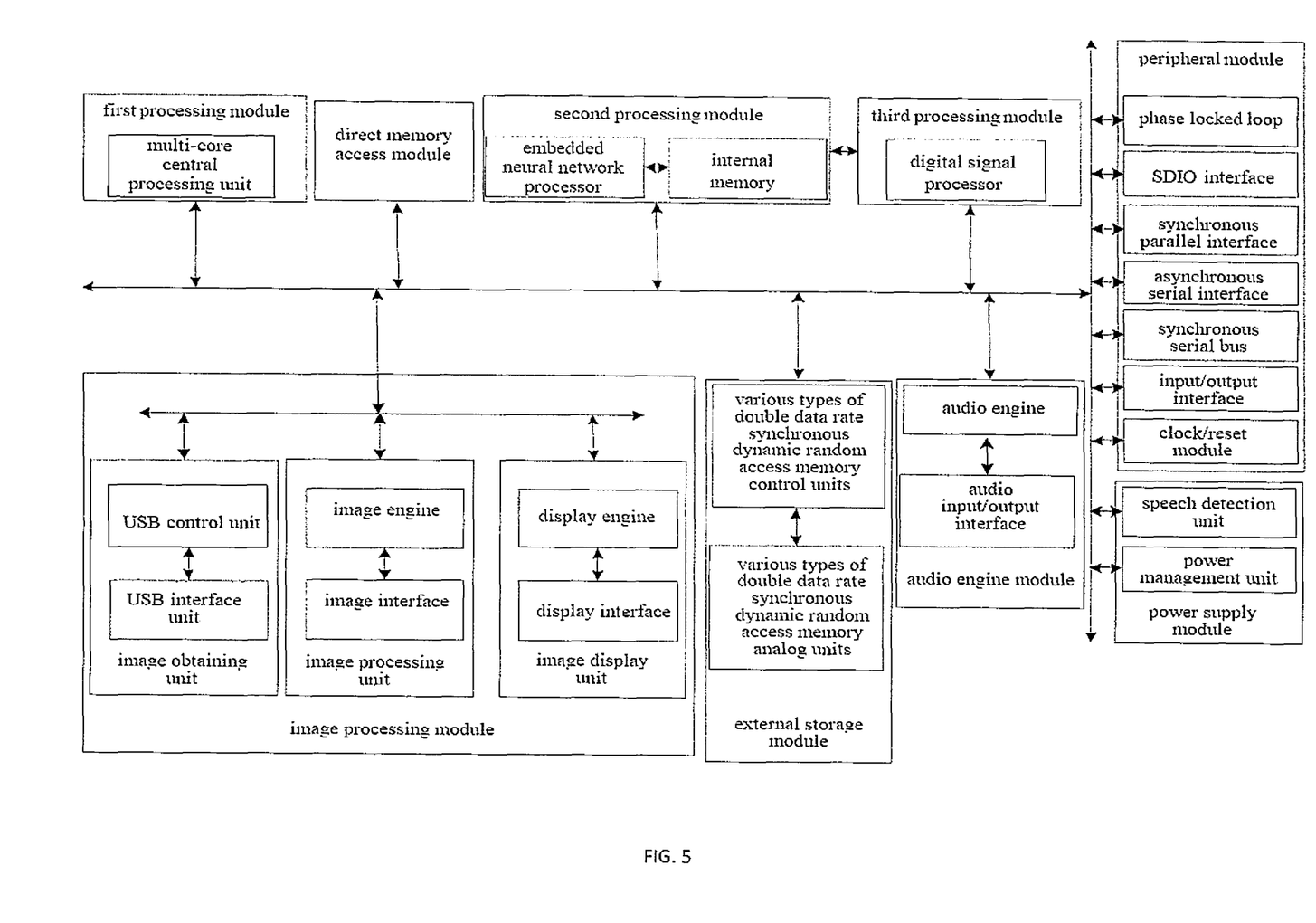
FIG. 5 is a schematic diagram of a speech chip according to Embodiment 5 of the present disclosure.

FIG. 5 is a schematic diagram of a speech chip according to Embodiment 5 of the present disclosure. Embodiment 5 is an optional implementation proposed on the basis of the foregoing embodiments. Referring to FIG. 5, the speech chip according to Embodiment 5 of the present disclosure includes the power supply module, the peripheral module, the first processing module, the second processing module, the third processing module, the storage module, the audio engine module, a direct memory access module and the image processing module.

The power supply module is configured to control the power on and off of modules other than the power supply module, and includes the speech detection unit and the power management unit.

The speech detection unit is configured to detect the speech from the user in real time.

The power management unit is configured to, in response to detecting the speech from the user, power on the third processing module. The third processing module detects whether the speech from the user includes the wake-up word. If the speech includes the wake-up word, modules other than the power supply module and the third processing module are powered on, such that the chip enters a wake-up state; otherwise modules other than the power supply module and the third processing module are continued to be powered off.

The peripheral module is configured to provide the clock of the chip, reset and the peripheral interface, and to collect the speech from the user through the peripheral interface after being powered on.

The first processing module, connected to the peripheral module, is configured to load the model data of the speech module if it is detected to be offline after being powered on, and to notify the second processing module to initialize the speech model based on the loaded data. The third processing module performs digital signal processing on the inputted speech, and sends the speech signal or speech feature data obtained after the processing to the second processing module. The second processing module recognizes the inputted speech based on the speech model. The first processing module makes a response based on the recognition result, and feeds the response result back to the user through the external device.

The second processing module, connected to the first processing module, is configured to recognize the processed speech from the user.

The second processing module includes the embedded neural network processor and the internal memory.

The embedded neural network processor is configured to perform the mutual conversion between speech and text based on the speech model.

The internal memory is connected to the embedded neural network processor and is configured to store the data generated during the execution of the model.

The third processing module, connected to the power supply module and the first processing module, is configured to perform the wake-up word detection on the speech from the user and to perform the digital signal processing on the inputted speech.

The storage module, connected to the first processing module, the second processing module, and the third processing module, is configured to store the loaded data for the speech model, and temporarily exchange data between the first processing module, the second processing module and the third processing module.

The audio engine module is connected to the peripheral module and is configured for the communication protocol processing of the audio interface.

The direct memory access module is configured to allow hardware devices of different speeds to communicate without relying on a massive interrupted load of the first processing module.

The image processing module is configured to process the image collected to broadcast and/or display the text information in the image to the user.

The image processing module includes the image obtaining unit, the image processing unit and the image display unit.

The image obtaining unit is configured to obtain the image.

The image processing unit is configured to perform the text recognition on the image. The first processing module controls the second processing module to perform the speech conversion on the text recognized and broadcasts the speech converted to the user through the external device.

The image display unit is configured to display the image and/or the text recognized.

Typically, the first processing module includes the multi-core central processing unit, which includes but is not limited to ARM A53 MP, RISCV 64-bit multi-core CPU.

The third processing module includes the digital signal processor, such as a HIFI4/5 DSP core.

The speech chip according to the embodiment of the present disclosure may build the following four mainstream speech application scenes.

Multiple application scenes of online smart speech at low cost and low power consumption: power is supplied to the third processing module, and the first processing module, the second processing module, the storage module and the image processing module are partially or completely powered off to form a variety of application scenes, which are especially suitable for applications of smart speech products of artificial intelligence & Internet of Things. In addition, the extremely low power consumption is suitable for battery devices, such as battery-powered smart speakers and mobile speech products.

An application scene of online smart speech products: power is supplied to the first processing module and the third processing module, and the second processing module, the storage module and the image processing module are partially or completely powered off. Since the second processing module, the storage module, and the image processing module are parts with the highest power consumption in the chip, such this application scene saves an overall power consumption of such applications, and an overall quality of online wake-up recognition of speech is improved. The cost of such a solution is lower than that of the existing dual-chip speech solution.

An application scene of offline smart speech products: power is supplied to the first processing module, the second processing module and the third processing module, and the image processing module is powered off. The offline speech function requires that a local chip may undertake or replace part of functions of an online cloud server. Therefore, it is necessary to optimize arithmetic capability of the second processing module, and a large storage module is required to store the latest speech model.

An application scene of full-featured speech products: power is supplied to all modules in the chip to support all online and offline speech functions, such as speech wake-up, speech recognition, text-to-speech (TTS) broadcast, and low-latency offline speech interaction control. Such scenes also include application scenes that combine images and texts, enriching applications of speech-based products.

The embodiment of the present disclosure has the following technical advantages.

The use of heterogeneous multi-core main body architecture of the first processing module, the second processing module and the third processing module, and a dynamically configurable module design combination enables the speech chip to realize the above-mentioned four mainstream speech application scenes.

Chip products based on the solution of the architecture may not only support online smart speech functions well, but also support various offline smart speech applications.

On the basis of the second processing module, the text-to-speech applications may be implemented.

By adding the image processing module, applications of images and text based on smart speech may be expanded.

Through the design of the speech detection unit and the power management unit, independent power supply management becomes attainable and overall standby power consumption is further reduced.

Embodiment 6

Figure 6:
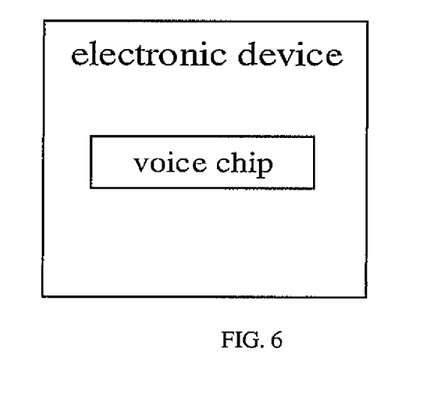
FIG. 6 is a schematic diagram of an electronic device according to Embodiment 6 of the present disclosure.

FIG. 6 is a schematic diagram of an electronic device according to Embodiment 6 of the present disclosure. The electronic device according to the embodiment of the present disclosure may be a personal computer, a cloud device, a mobile device, a smart speaker, and so on. The mobile device may be a hardware device having an operating system, a touch screen, and/or a display screen, such as a mobile phone, a tablet computer, a personal digital assistant, a wearable device, and a vehicle-mounted device.

As illustrated in FIG. 6, the electronic device may include the speech chip as proposed in the foregoing embodiments of the present disclosure.

It should be noted that the explanation of the speech chip according to the foregoing embodiments is also applicable to the electronic device according to this embodiment, and thus repeated description is omitted herein.

Figure 7:
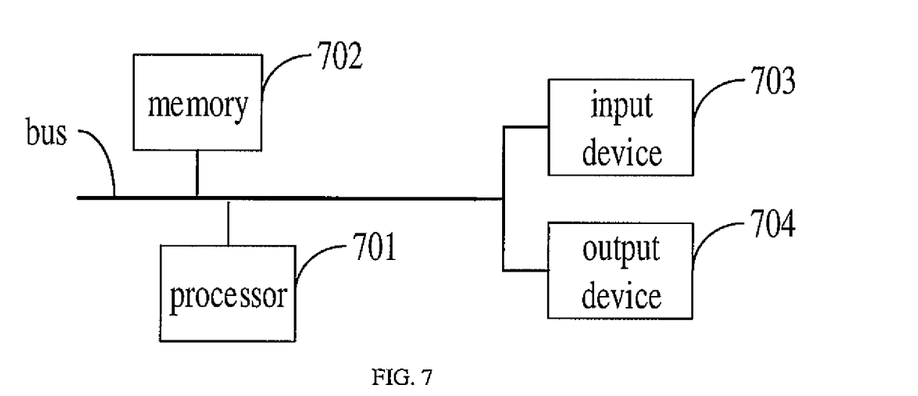
FIG. 7 is a block diagram of an electronic device according to Embodiment 6 of the present disclosure.

FIG. 7 is a block diagram of an exemplary electronic device suitable for implementing embodiments of the present disclosure. The electronic device illustrated in FIG. 7 is only an example, and should not bring any limitation to functions and scope of use of embodiments of the present disclosure.

The electronic device is intended to represent various forms of digital computers, such as a laptop computer, a desktop computer, a workbench, a personal digital assistant, a server, a blade server, a mainframe computer and other suitable computers. The electronic device may also represent various forms of mobile devices, such as a personal digital processor, a cellular phone, a smart phone, a wearable device and other similar computing devices. Components shown herein, their connections and relationships as well as their functions are merely examples, and are not intended to limit the implementation of the present disclosure described and/or required herein.

As illustrated in FIG. 7, the electronic device includes: one or more processors 701, a memory 702, and interfaces for connecting various components, including a high-speed interface and a low-speed interface. The components are interconnected by different buses and may be mounted on a common motherboard or otherwise installed as required. The processor may process instructions executed within the electronic device, including instructions stored in or on the memory to display graphical information of the GUI on an external input/output device (such as a display device coupled to the interface). In other embodiments, when necessary, multiple processors and/or multiple buses may be used with multiple memories. Similarly, multiple electronic devices may be connected, each providing some of the necessary operations (for example, as a server array, a group of blade servers, or a multiprocessor system). One processor 701 is taken as an example in FIG. 7.

The memory 702 is a non-transitory computer-readable storage medium according to the embodiments of the present disclosure. The memory stores instructions executable by at least one processor, so that the at least one processor executes functions according to embodiments of the present disclosure. The non-transitory computer-readable storage medium according to the present disclosure stores computer instructions, which are configured to make the computer execute the functions according to embodiments of the present disclosure.

As a non-transitory computer-readable storage medium, the memory 702 may be configured to store non-transitory software programs, non-transitory computer executable programs and modules, such as program instructions/modules corresponding to the functions according to embodiments of the present disclosure. The processor 701 executes various functional applications and performs data processing of the server by running non-transitory software programs, instructions and modules stored in the memory 702, that is, the functions according to the foregoing method embodiments are implemented.

The memory 702 may include a storage program area and a storage data area, where the storage program area may store an operating system and applications required for at least one function; and the storage data area may store data created according to the use of the electronic device, and the like. In addition, the memory 702 may include a high-speed random access memory, and may further include a non-transitory memory, such as at least one magnetic disk memory, a flash memory device, or other non-transitory solid-state memories. In some embodiments, the memory 702 may optionally include memories remotely disposed with respect to the processor 701, and these remote memories may be connected to the electronic device through a network. Examples of the network include, but are not limited to, the Internet, an intranet, a local area network, a mobile communication network, and combinations thereof.

The electronic device may further include an input device 703 and an output device 704. The processor 701, the memory 702, the input device 703 and the output device 704 may be connected through a bus or in other manners. FIG. 7 is illustrated by establishing the connection through a bus.

The input device 703 may receive input numeric or character information, and generate key signal inputs related to user settings and function control of the electronic device, such as a touch screen, a keypad, a mouse, a trackpad, a touchpad, a pointing stick, one or more mouse buttons, trackballs, joysticks and other input devices. The output device 704 may include a display device, an auxiliary lighting device (for example, an LED), a haptic feedback device (for example, a vibration motor), and so on. The display device may include, but is not limited to, a liquid crystal display (LCD), a light emitting diode (LED) display and a plasma display. In some embodiments, the display device may be a touch screen.

It should be understood that various modules, units and devices illustrated above may be recombined, added or deleted. As long as the desired results of the technical solution disclosed in the present disclosure may be achieved, there is no limitation herein.

The foregoing specific implementations do not constitute a limit on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A speech chip, comprising: a first processing module, a second processing module, and a third processing module;
    wherein, the first processing module is configured to run an operating system, and to perform data scheduling on modules other than the first processing module in the chip;
    the second processing module is configured to perform a mutual conversion between speech and text based on a speech model; and
    the third processing module is configured to perform digital signal processing on inputted speech.

2. The chip of claim 1, wherein the second processing module comprises a processor and an internal memory;
    wherein the processor is configured to perform the mutual conversion between speech and text based on the speech model; and
    the internal memory is connected to the processor and is configured to store data generated during an execution of the speech model.

3. The chip of claim 2, wherein,
    the second processing module is configured to set configuration information of the speech model based on model data to initialize the speech model;
    wherein the model data is obtained by the first processing module from an external storage device through a peripheral interface.

4. The chip of claim 3, further comprising a storage module connected to the second processing module and configured to store the model data.

5. The chip of claim 2, wherein the processor is an embedded neural network processor.

6. The chip of claim 1, wherein,
    the third processing module is configured to perform the digital signal processing on the inputted speech to obtain a speech signal or speech feature data, and to send the speech signal or the speech feature data obtained to the second processing module;
    the second processing module is configured to recognize the inputted speech based on the speech model; and
    the first processing module is configured to obtain a response result from an external storage device through a peripheral interface based on a recognition result, and to feed the response result back to a user.

7. The chip of claim 1, comprising a power supply module, wherein the power supply module comprises: a speech detection unit and a power management unit;
    wherein the speech detection unit is configured to detect speech from a user in real time; and
    the power management unit is configured to, in response to detecting the speech from the user, supply power to the third processing module, such that the third processing module performs wake-up word detection on the speech from the user; and in response to the speech from the user comprising a wake-up word, supply power to modules other than the power supply module and the third processing module.

8. The chip of claim 1, further comprising an image processing module, configured to process an image collected to broadcast and/or display text information in the image to the user.

9. The chip of claim 8, wherein the image processing module comprises: an image obtaining unit, an image processing unit and an image display unit;
    wherein the image obtaining unit is configured to obtain the image;
    the image processing unit is configured to perform text recognition on the image, and the first processing module controls the second processing module to perform speech conversion on a text recognized and broadcasts speech converted to a user through an external device; and
    the image display unit is configured to display the image and/or the text recognized.

10. The chip of claim 1, wherein the first processing module comprises a multi-core central processing unit; and
    the third processing module comprises a digital signal processor.

11. An electronic device, comprising an audio interface and a speech chip, wherein,
    the audio interface is configured to receive inputted speech;
    the speech chip comprises: a first processing module, a second processing module, and a third processing module;
    the first processing module is configured to run an operating system, and to perform data scheduling on modules other than the first processing module in the chip;
    the second processing module is configured to perform a mutual conversion between speech and text based on a speech model; and
    the third processing module is configured to perform digital signal processing on the inputted speech.

12. The device of claim 11, wherein the second processing module comprises a processor and an internal memory;
    wherein the processor is configured to perform the mutual conversion between speech and text based on the speech model; and
    the internal memory is connected to the processor and is configured to store data generated during an execution of the speech model.

13. The device of claim 12, wherein,
    the second processing module is configured to set configuration information of the speech model based on model data to initialize the speech model;
    wherein the model data is obtained by the first processing module from an external storage device through a peripheral interface.

14. The device of claim 13, further comprising a storage module, connected to the second processing module and configured to store the model data.

15. The device of claim 12, wherein the processor is an embedded neural network processor.

16. The chip of claim 11, wherein,
the third processing module is configured to perform the digital signal processing on the inputted speech to obtain a speech signal or speech feature data and to send the speech signal or the speech feature data obtained to the second processing module;
the second processing module is configured to recognize the inputted speech based on the speech model; and
the first processing module is configured to obtain a response result from an external storage device through a peripheral interface based on a recognition result, and to feed the response result back to a user.

17. The device of claim 11, further comprising a power supply module, wherein the power supply module comprises a speech detection unit and a power management unit;
wherein the speech detection unit is configured to detect speech from a user in real time; and
the power management unit is configured to, in response to detecting the speech from the user, supply power to the third processing module, such that the third processing module performs wake-up word detection on the speech from the user; and in response to the speech from the user comprising a wake-up word, supply power to modules other than the power supply module and the third processing module.

18. The device of claim 11, wherein the speech chip further comprises an image processing module, configured to process an image collected to broadcast and/or display text information in the image to the user.

19. The device of claim 18, wherein the image processing module comprises: an image obtaining unit, an image processing unit and an image display unit;
wherein the image obtaining unit is configured to obtain the image;
the image processing unit is configured to perform text recognition on the image, and the first processing module controls the second processing module to perform speech conversion on a text recognized and broadcasts speech converted to a user through an external device; and
the image display unit is configured to display the image and/or the text recognized.

20. The device of claim 11, wherein the first processing module comprises a multi-core central processing unit; and
the third processing module comprises a digital signal processor.

* * * * *